G. TAGLIABUE.
Barometer.
No. 24,674.  Patented July 5, 1859.
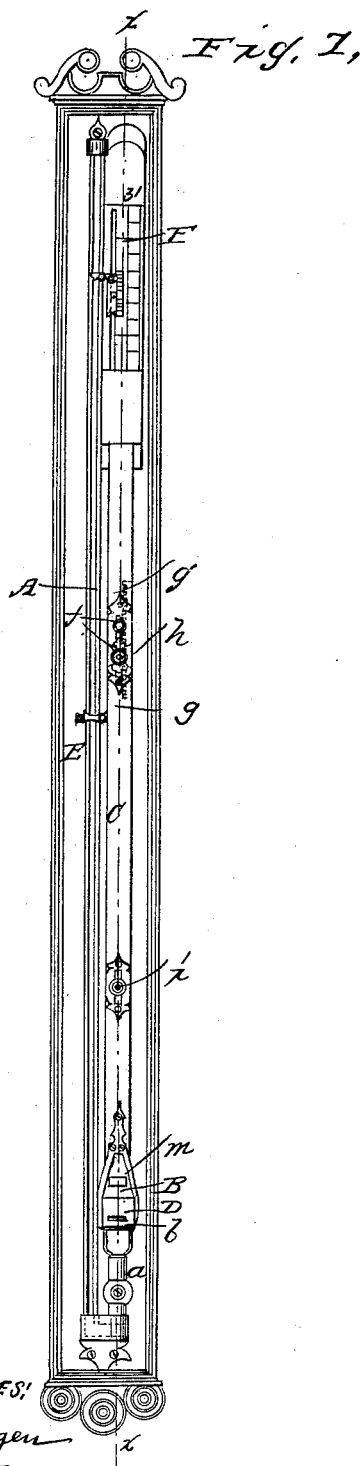
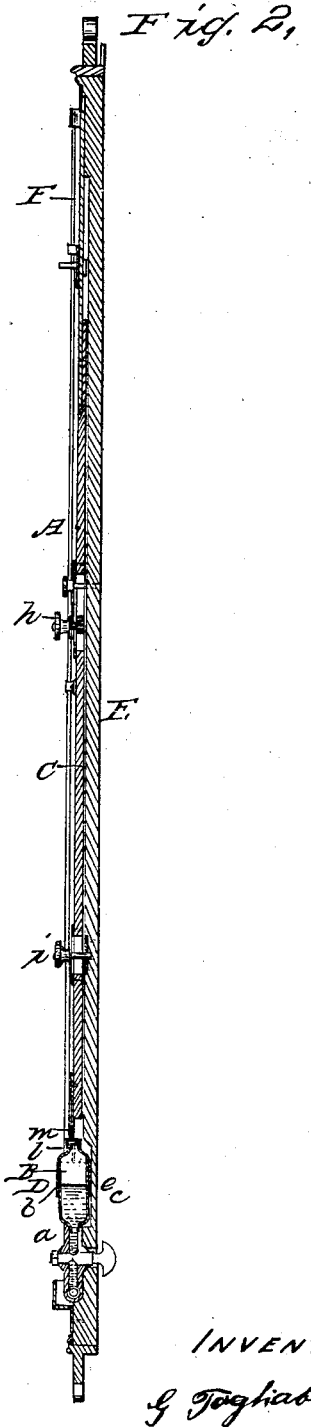
WITNESSES:
R. D. Traphagen
O. D. Munro
INVENTOR:
G. Tagliabue

UNITED STATES PATENT OFFICE.

GIUSEPPE TAGLIABUE, OF NEW YORK, N. Y.

MERCURIAL BAROMETER.

Specification of Letters Patent No. 24,674, dated July 5, 1859.

*To all whom it may concern:*

Be it known that I, GIUSEPPE TAGLIABUE, of the city, county, and State of New York, have invented a new and useful Improvement in Barometers; and I do hereby declare that the following is a full, clear, and exact description of the same, reference being had to the accompanying drawings, forming part of this specification, in which—

Figure 1, is a front view of a barometer with my improvement. Fig. 2, is a vertical section in the line $x$, $x$, of Fig. 1.

Similar letters of reference indicate corresponding parts in both figures.

My invention consists in an improved mode of applying a gage attached to an adjustable scale in combination with the cistern or lower limb of a mercurial barometer for the purpose of enabling the scale to be adjusted to the level of the mercury in the cistern or lower limb.

To enable others skilled in the art to apply my invention, I will proceed to describe its construction and operation.

A, is the tube bent at the bottom and connected by a cock $a$, with the mercury cistern B, which is of cylindrical form and covered at the top with a piece of soft leather or other substance pervious to air, $l$, Fig. 2, and with a perforated cap $m$.

C, is a slide fitted to a groove in the board or frame E, to which the tube is secured and having at its upper end the scale F. To the lower end of this slide is attached a sleeve D, of metal or other material which fits loosely to the cylindrical exterior of the cistern B, said sleeve constituting the gage, having a narrow horizontal slot $b$, in front and a corresponding slot $c$, at the back, from the upper edges of which slots the scale is graduated; and in the board or frame E, there is a wider slot $e$, behind the cistern and sleeve.

F, is a pinion having its axle fitted to turn in a bearing in the slide C, and gearing with a stationary rack $g$, within the board E. This pinion, which works in a slot in the slide, has a small knob $h$, outside of the said slide to enable it to be turned for the purpose of raising and lowering the slide and its scale.

$i$, is a set screw, passing through a slot in the slide and screwing into a fixed nut in the board.

The barometer constructed as above described should be so placed that light may be admitted through the slots $b$, $c$, $e$, and I propose generally to hinge it to the side of a window-casing so that it may be turned toward the light to adjust the scale, when it is desired to take an observation. The adjustment is made by turning the pinion $f$, to bring the slide to such a position that a thin streak of light is visible between the surface of the mercury in the cistern and the upper edges of the slots $b$, $c$.

The sleeve gage D, may be applied in the same manner in combination with the scale and cistern of a marine or mountain barometer, and possesses the advantage over a gage applied within the cistern, that it admits of the barometer being made portable. The cock $a$, below the cistern is merely to make the barometer portable by letting the mercury run up to the top of the tube A, and then shutting it in to prevent the admission of air, but this constitutes no part of my invention.

I do not claim making the scale adjustable to the level of the mercury in the cistern or lower limb of the barometer. But

What I claim as my invention and desire to secure by Letters Patent, is:

The external slotted sleeve-gage D, applied in combination with the cistern or lower limb of the barometer and with the adjustable scale substantially as and for the purposes herein described.

GIUSEPPE TAGLIABUE.

Witnesses:
R. D. TRAPHAGEN,
O. D. MUNN.